United States Patent
Khorasaninejad et al.

(10) Patent No.: US 10,866,360 B2
(45) Date of Patent: Dec. 15, 2020

(54) BROADBAND MULTIFUNCTIONAL EFFICIENT META-GRATINGS BASED ON DIELECTRIC WAVEGUIDE PHASE SHIFTERS

(71) Applicant: PRESIDENT AND FELLOWS OF HARVARD COLLEGE, Cambridge, MA (US)

(72) Inventors: Mohammadreza Khorasaninejad, Cambridge, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

(21) Appl. No.: 15/745,925

(22) PCT Filed: Aug. 18, 2016

(86) PCT No.: PCT/US2016/047639
§ 371 (c)(1),
(2) Date: Jan. 18, 2018

(87) PCT Pub. No.: WO2017/031366
PCT Pub. Date: Feb. 23, 2017

(65) Prior Publication Data
US 2018/0210147 A1    Jul. 26, 2018

Related U.S. Application Data

(60) Provisional application No. 62/207,054, filed on Aug. 19, 2015.

(51) Int. Cl.
*G02B 6/12* (2006.01)
*G02B 6/124* (2006.01)
*G02B 5/18* (2006.01)
*G02B 6/10* (2006.01)

(52) U.S. Cl.
CPC ............... *G02B 6/124* (2013.01); *G02B 5/18* (2013.01); *G02B 6/107* (2013.01); *G02B 2006/12061* (2013.01); *G02B 2006/12078* (2013.01)

(58) Field of Classification Search
CPC ....................................................... G02B 6/12
USPC ......................................................... 385/14
See application file for complete search history.

(56) References Cited

U.S. PATENT DOCUMENTS

| | | | | |
|---|---|---|---|---|
| 5,065,390 A | * | 11/1991 | Miyauchi | G11B 5/313 369/110.01 |
| 6,718,093 B2 | * | 4/2004 | Zhou | G02B 6/12002 385/14 |
| 6,870,987 B2 | * | 3/2005 | Lee | G02B 6/132 385/28 |

(Continued)

OTHER PUBLICATIONS

International Search Report and Written Opinion for International Patent Application No. PCT/US2016/47639, dated Jan. 5, 2017, 11 pages.

*Primary Examiner* — Kaveh C Kianni
(74) *Attorney, Agent, or Firm* — Foley & Lardner LLP

(57) ABSTRACT

A phase shift element includes a substrate and a dielectric ridge waveguide (DRW) disposed on the substrate. The DRW includes a dielectric material, and a width of the DRW is less than 500 nanometers (nm). A meta-grating includes a substrate and multiple dielectric ridge wave-guides (DRWs) disposed on the substrate.

20 Claims, 9 Drawing Sheets

(56) References Cited

U.S. PATENT DOCUMENTS

| | | | | |
|---|---|---|---|---|
| 6,934,427 B2* | 8/2005 | Lee | G02B 6/12004 | 385/14 |
| 7,103,245 B2* | 9/2006 | Lee | G02B 6/10 | 385/28 |
| 7,469,558 B2* | 12/2008 | Demaray | B29D 11/00663 | 65/386 |
| 7,509,006 B2* | 3/2009 | Shiraishi | G02B 6/305 | 359/245 |
| 7,529,455 B2* | 5/2009 | Suzuki | B82Y 20/00 | 385/129 |
| 7,645,076 B2* | 1/2010 | Martini | G02B 6/132 | 385/141 |
| 7,653,278 B2* | 1/2010 | Hamada | G02B 1/045 | 385/129 |
| 7,853,108 B2* | 12/2010 | Popovic | G02B 6/107 | 385/126 |
| 8,571,373 B2* | 10/2013 | Wang | G02B 6/1225 | 385/129 |
| 9,329,308 B2* | 5/2016 | Solgaard | G02B 3/0087 | |
| 9,632,248 B2* | 4/2017 | Selvaraja | G02B 6/30 | |
| 2003/0108294 A1 | 6/2003 | Zheng | G02B 6/12004 | 385/39 |
| 2003/0150737 A1* | 8/2003 | Van Delft | G03F 7/0005 | 205/118 |
| 2004/0184732 A1* | 9/2004 | Zhou | G01J 3/02 | 385/37 |
| 2005/0195407 A1* | 9/2005 | Nordin | G01N 21/7703 | 356/501 |
| 2007/0030870 A1 | 2/2007 | Bour et al. | | |
| 2008/0074748 A1* | 3/2008 | Kittaka | G01J 3/02 | 359/576 |
| 2008/0285610 A1* | 11/2008 | Hall | C03C 13/048 | 372/45.011 |
| 2009/0097122 A1* | 4/2009 | Niv | G02B 5/1866 | 359/575 |
| 2010/0187402 A1* | 7/2010 | Hochberg | G02B 6/12004 | 250/208.1 |
| 2011/0069969 A1* | 3/2011 | Hochberg | B82Y 20/00 | 398/141 |
| 2011/0128610 A1* | 6/2011 | Gunter | G02F 1/061 | 359/322 |
| 2012/0163821 A1* | 6/2012 | Kwon | H01S 5/026 | 398/79 |
| 2012/0269483 A1* | 10/2012 | Mossberg | B29D 11/0074 | 385/37 |
| 2014/0146390 A1* | 5/2014 | Kaempfe | G02B 5/1809 | 359/485.01 |
| 2015/0125111 A1* | 5/2015 | Orcutt | G02B 6/122 | 385/14 |
| 2015/0185413 A1 | 7/2015 | Greiner et al. | | |
| 2015/0247971 A1* | 9/2015 | Wertsberger | G02B 6/13 | 204/192.34 |
| 2015/0309220 A1* | 10/2015 | Greiner | G02B 5/1871 | 359/350 |
| 2017/0090118 A1* | 3/2017 | Sodagar | G02B 5/20 | |
| 2017/0102544 A1* | 4/2017 | Vallius | G02B 27/4205 | |

* cited by examiner

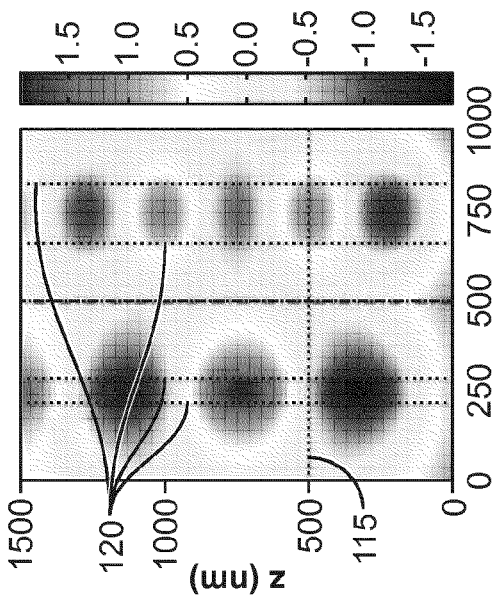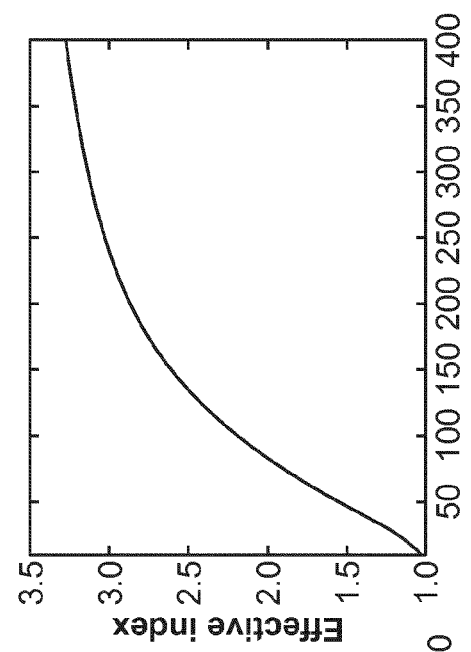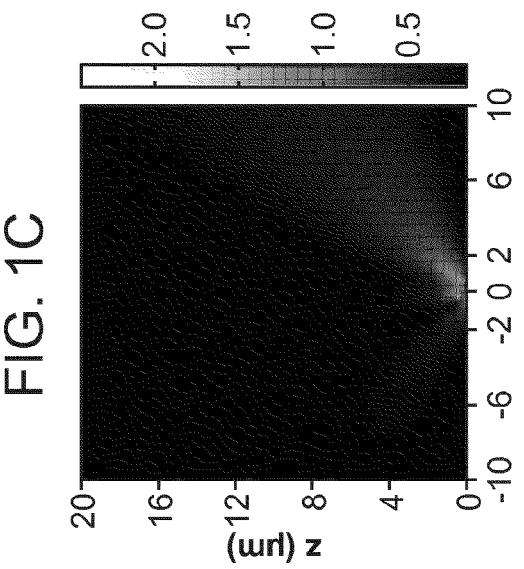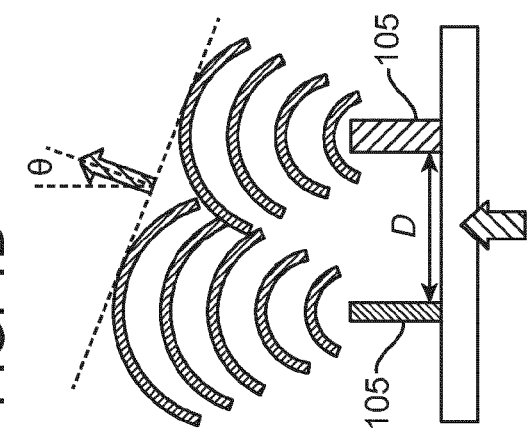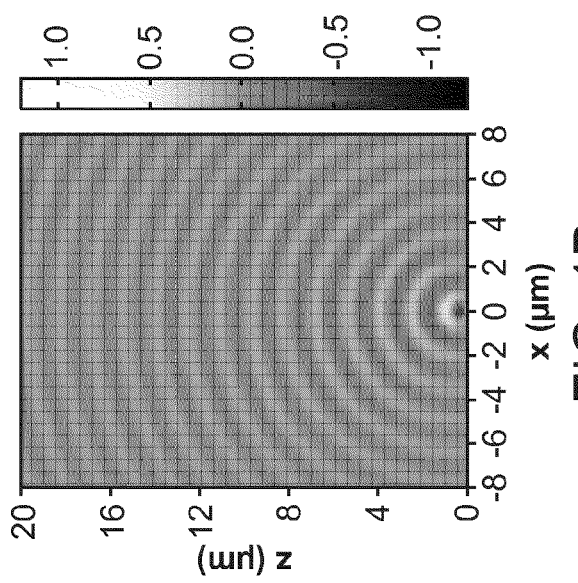

BROADBAND MULTIFUNCTIONAL EFFICIENT META-GRATINGS BASED ON DIELECTRIC WAVEGUIDE PHASE SHIFTERS

CROSS-REFERENCE TO RELATED PATENT APPLICATIONS

This application is a National Stage Entry of International Application No. PCT/US2016/047639, filed Aug. 18, 2016, which claims the benefit of U.S. Provisional Patent Application No. 62/207,054 filed Aug. 19, 2015 to Khorasaninejad et al., titled "Broadband Multifunctional Efficient Meta-Gratins based on Dielectric Waveguide Phase Shifters," the contents of which are incorporated herein by reference in their entirety.

STATEMENT REGARDING FEDERALLY SPONSORED RESEARCH OR DEVELOPMENT

This invention was made with Government support from the Air Force Office of Scientific Research (MURI) under grant number FA9550-14-1-0389. The Government has certain rights in the invention.

BACKGROUND

Molding a wavefront of light is a principle of optical design. In conventional optical components such as lenses and waveplates, the wavefront is controlled via propagation phases in a medium much thicker than the wavelength. However, the material properties of such media limit optical design.

SUMMARY

In an aspect, a phase shift element includes a substrate and a dielectric ridge waveguide (DRW) disposed on the substrate. The substrate may be transparent. Non-limiting examples are described below in which the substrate is glass. The DRW includes a dielectric material. In an embodiment, the DRW is configured to bend incident electromagnetic energy and direct the electromagnetic energy in one direction. In an embodiment, a width of the DRW is less than about 500 nanometers (nm). In an embodiment, the width of the DRW is about 50 nm to about 150 nm. In an embodiment, the width of the DRW is about 100 nm. In an embodiment, the width of the DRW is less than a wavelength of incident electromagnetic energy, and a length of the DRW is less than or in the order of the wavelength of the incident electromagnetic energy. In an embodiment, a ratio of the length to the width of the DRW is greater than one, such as at least about 1.5:1, at least about 2:1, at least about 3:1, at least about 4:1, or at least about 5:1. In an embodiment, the phase shift element includes a plurality of DRWs of which the DRW is one, wherein the plurality of DRWs are disposed on the substrate, and wherein the phase shift element is configured to split incident electromagnetic energy and direct the electromagnetic energy in two directions In another aspect, a meta-surface includes a substrate and an array of periodic unit cells, where each periodic unit cell includes two DRWs disposed on the substrate and configured to change a direction of incident electromagnetic energy in a predefined energy spectrum. In a unit cell, a width of a first of the DRWs is greater than a width of a second of the DRWs. A center-to-center distance between the two DRWs is less than a minimum wavelength of electromagnetic energy in the predefined energy spectrum. In an embodiment, the DRWs each comprise a dielectric material. In an embodiment, a width of each DRW is less than about 500 nm. In an embodiment, the width of each DRW is about 50 nm to about 150 nm. In an embodiment, the width of each DRW is less than a wavelength of incident electromagnetic energy, and a length of the DRW is less than the wavelength of incident electromagnetic energy. In an embodiment, a ratio of the length to the width of each DRW is at least about 1.5:1, at least about 2:1, at least about 3:1, at least about 4:1, or at least about 5:1.

In another aspect, a meta-grating includes a substrate and DRWs disposed on the substrate. In an embodiment, the meta-grating is configured to change a direction of incident electromagnetic energy in a predefined energy spectrum. In this embodiment, the DRWs are arranged in pairs, and in each pair, a width of a first of the DRWs is greater than a width of a second of the DRWs, and a center-to-center distance between the pair of DRWs is less than a minimum wavelength of electromagnetic energy in the predefined energy spectrum. In another embodiment, the meta-grating is configured to split incident electromagnetic energy and direct the electromagnetic energy in two directions, where the DRWs are arranged in unit cells of three DRWs, and the three DRWs in a unit cell have substantially a same width and substantially a same length. In an embodiment, a width of each DRW is less than about 500 nm. In an embodiment, the width of each DRW is about 50 nm to about 150 nm. In an embodiment, the width of each DRW is less than a wavelength of incident electromagnetic energy, and a length of the DRW is less than the wavelength of incident electromagnetic energy. In an embodiment, a ratio of the length to the width of each DRW is at least about 1.5:1, at least about 2:1, at least about 3:1, at least about 4:1, or at least about 5:1. In an embodiment, the meta-grating is configured to disperse the incident light and act as a grating. In an embodiment, the meta-grating is configured to spatially separate two orthogonal polarizations of incident light. In an embodiment, the DRWs are configured to redirect one polarization of incident light and allow other polarizations of incident light to pass through undisturbed. In an embodiment, the DRWs are embedded in a low refractive index material with refractive index less than about 1.7, such as about 1.65 or less, about 1.6 or less, about 1.55 or less, or about 1.5 or less. In an embodiment, the DRWs are embedded in a dielectric material or in a polymer. In an embodiment, the meta-grating is configured as a polarization beam splitter. In an embodiment, the meta-grating is incorporated into an optical isolator.

In an embodiment of any of the aspects, a width of at least one DRW is less than one half of a minimum wavelength of incident electromagnetic energy in a predefined energy spectrum. In one or more embodiments of the present disclosure, the predefined energy spectrum is a spectrum of human-visible light. In one or more embodiments of the present disclosure, the predefined energy spectrum is spectrum of near-infrared or infrared light. In an embodiment of any of the aspects, at least one DRW includes a material with a refractive index greater than 1.5. Non-limiting examples are described below in which the DRWs include amorphous silicon with a refractive index of approximately 3.5. In an embodiment of any of the aspects, at least one DRW includes one of amorphous silicon, gallium phosphide, a titanium oxide (e.g., $TiO_2$), or silicon nitride.

BRIEF DESCRIPTION OF THE DRAWINGS

FIG. 1A depicts an example of a DRW according to embodiments of the present disclosure.

FIG. 1B, FIG. 1C, and FIG. 1D provide simulation results of a DRW according to embodiments of the present disclosure.

FIG. 1E depicts an example of light bending by a DRW according to embodiments of the present disclosure.

FIG. 1F illustrates light bending by a DRW according to embodiments of the present disclosure.

DETAILED DESCRIPTION

Figure 2A:
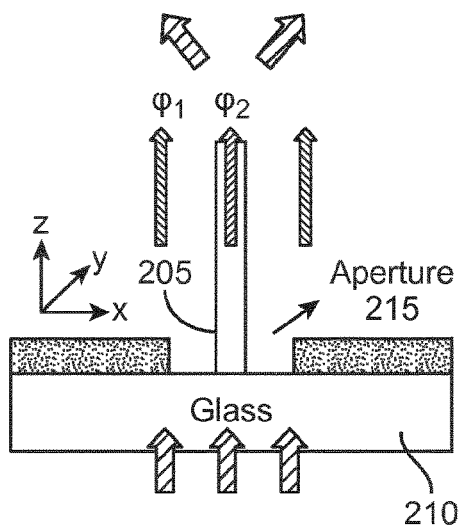
FIG. 2A depicts an example of a DRW according to embodiments of the present disclosure.

The present disclosure describes meta-surfaces which use DRWs as phase shift elements in which phase accumulation is achieved via propagation over a sub-wavelength distance. By engineering the dispersive response of DRWs, high resolving power meta-gratings with broadband (e.g., lambda ($\lambda$)=about 1.1 micrometers ($\mu$m) to about 1.8 $\mu$m) routing are realized, with efficient routing (e.g., splitting and bending) into a single diffraction order, thus overcoming the limits of blazed gratings. Experimental results are provided to illustrate the effectiveness of the DRWs. In addition, polarization beam splitting capabilities with large suppression ratios are demonstrated.

Metamaterials open new opportunities in optics by overcoming limits of natural material properties. Phenomena such as perfect (or near-perfect) lensing, optical cloaking and negative index of refraction are some examples of new properties provided by metamaterials.

Meta-surfaces have added optical functionalities with the advantage of scalable fabrication as compared to three-dimensional (3D) metamaterials. A meta-surface is an array of sub-wavelength spaced phase shift elements laid out in a pattern on a flat surface to control a wavefront of light. Based on this approach, various optical functionalities have been demonstrated in very compact and flat configurations, including beam shaping, lensing, beam bending, and polarization splitting. Phase shift elements of a meta-surface generally satisfy two criteria, namely they (i) have sub-wavelength size and spacing, and they (ii) create a phase shift across the $2\pi$ range to achieve full control of the wavefront.

Described herein are experimentally-demonstrated sub-wavelength sized phase shifters based on DRWs. The demonstrated phase shifters have the ability to efficiently route (e.g., split and bend) light over a broad range of wavelengths in the near infrared (NIR) spectrum. It is expected that the concepts described in this disclosure are extendable to other portions of the electromagnetic energy spectrum. For extension into the visible spectral range, other materials such as gallium phosphide, a titanium oxide and silicon nitride can be used. The concepts described avoid issues of high absorption losses, polarization conversion, scattering efficiency and fabrication complexity, which are issues faced by other meta-surface or metamaterial designs.

Wavelength de-multiplexing, with applications ranging from spectroscopy to communication, conventionally has relied on blazed diffraction gratings in which a majority of transmitted or reflected light is funneled into a single order. Generally, blazed gratings are designed so that the incident beam experiences a gradual $2\pi$ phase shift over a grating period, which is achieved through either a continuous profile or a staircase approximation. A continuous profile may be achieved by triangular grooves, and a staircase approximation may be achieved using graded-index material available by nano-fabrication techniques.

Regardless of the grating configuration, chromatic dispersion of the material or elements of the blazed grating makes it challenging to maintain high efficiency over a broad range of wavelengths. In other words, by operating at a wavelength away from a design wavelength, the light is diffracted to undesired orders, thus reducing the grating efficiency. Additionally, a small deflection angle deteriorates the resolving power of the grating and limits its ability to separate nearby wavelengths. Further, keeping the grating blazed is challenging, particularly when the grating operates at a large deflection angle. This is a long standing obstacle to obtaining highly efficient blazed gratings, and is called the shadow effect. The shadow effect significantly degrades the performance of the grating when the period is in the order of a few wavelengths or less. A smaller period demands a higher phase gradient, which is harder to preserve over a broad range of wavelengths. Such limitations on gratings are overcome by the techniques described in the present disclosure, capitalizing on an engineered dispersive response of phase shifting waveguide elements.

FIG. 1A illustrates an example of a DRW 105 phase shift element of amorphous silicon (a-Si) on a glass substrate 110. The DRW 105 acts as a slab waveguide with a propagation direction along the +z axis. The DRW 105 has a subwavelength width W and length L, and confines the light along the x direction. For simulation, the DRW 105 is infinitely extended along the y direction. In fabricated structures, the DRW 105 is at least about 125 $\mu$m along the y direction.

FIG. 1B plots simulation results of an effective index ($n_{eff}$) of the DRW 105 of FIG. 1A as a function of its width W, for parallel polarization ($E_y$). As can be seen, by adjusting a width of the DRW 105, the effective index ($n_{eff}$) of its fundamental mode can vary from $n_{eff} \approx 1$ (when the light is mostly in air) to $n_{eff} \approx n_{aSi}$ (when the light is mostly in a-Si). If there are two DRWs 105 side-by-side of about equal length L, with different widths and negligible optical coupling between the DRWs 105, then light traveling down the different DRWs 105 will accumulate a phase shift $\Delta\varphi$ proportional to the length L, as shown in Equation (1), where $\Delta n_{eff}$ is the effective index difference between the two DRWs 105.

$$\Delta\varphi = \frac{2\pi}{\lambda}\Delta n_{eff} \times L \quad (1)$$

A phase difference of $\Delta\varphi=2\pi$ can be obtained over a sub-wavelength propagation length L shown in Equation (2) if the two DRWs 105 are designed with a $\Delta n_{eff}$ that exceeds unity.

$$L = \frac{\lambda}{\Delta n_{eff}} \quad (2)$$

Achieving $\Delta\varphi=2\pi$ is pivotal to full control of the wavefront.

FIG. 1C provides simulation results of a model of two DRWs 105 of different widths, indicating an emergence of a phase difference between the two DRWs 105 along a sub-wavelength propagation distance. For instance, a phase difference $\Delta\varphi$ of about 100° (0.55 $\pi$) is obtained after a propagation length L of about 500 nm, marked by a horizontal dotted line in FIG. 1C. Because of strong confinement in the DRWs 105, waveguide coupling is negligible. A design width of the simulated DRW 105 on the left of FIG. 1C is 70 nm, and a design width of the simulated DRW 105 on the right of FIG. 1C is 170 nm, where boundaries of the simulated DRWs 105 are shown by vertical dotted lines. Simulations were performed under plane-wave excitation and parallel polarization (electric field along the y direction) with wavelength 1425 nm. For the simulation, perfectly matched layer (PML) and periodic boundary conditions were used for z and x, respectively. For the simulations, semi-infinite long DRWs 105 were assumed, with PML at the z-boundaries, so that end-facet reflections were eliminated. This assumption helps visualize mode propagation and the emergence of the phase difference between two optical modes; and despite neglecting end-facet reflections, the model is quantitatively predictive, as discussed below.

Owing to its high index-contrast, an a-Si DRW 105 waveguide can confine light in a sub-wavelength region. For example, as will be discussed below with respect to FIG. 6, results confirm sub-wavelength confinement of optical modes of slab waveguides with widths of about 70 nm and about 170 nm at a wavelength of about 1425 nm. Consequently, when a light beam reaches an end-facet of the DRW 105, the light couples out into free space uniformly in the xz-plane.

FIG. 1D illustrates a simulation of an electric field (real [$E_y$]) distribution in the xz-plane, illustrating that the DRW 105 radiates into free space. This is expected from the multipole expansion: a radiator much smaller than a wavelength tends to emit approximately a dipole radiation pattern. The simulated DRW 105 is located at x=0 and has width of 70 nm and length of about 500 nm.

While DRWs 105 with 70 nm and 170 nm widths can have a distinctive phase difference (FIGS. 1B and 1C), they generate similar free space propagation patterns (see, e.g., FIG. 7 and related discussion below). This is as expected, due to a similarity with nearly equal full width at half maximum (FWHM) of the optical modes of the DRWs 105. An ability to control the propagation phase of a DRW 105 (by adjusting a width of the DRW 105) without corresponding changes in radiation patterns makes the DRW 105 ideally suited for use as a meta-surface phase shift element. In addition, the strong confinement of the optical modes allows for the DRWs 105 to be packed very densely, with sub-wavelength separation and minimal coupling.

Consider an example of two DRW 105 phase shift elements with a phase difference of $\Delta\varphi$ at a sub-wavelength distance D from each other. An incident light beam can be directed by the two DRWs 105 at an angle $\theta$, as illustrated in FIG. 1E. A value of $\theta$ depends on $\Delta\varphi$, $\lambda$, and D, and is governed by conditions of constructive interference along the direction defined by $\theta$, as shown in Equation (3).

$$\Delta\varphi = \frac{2\pi \cdot D}{\lambda}\sin(\theta) \quad (3)$$

Two DRWs 105, having approximately a same length L of about 500 nm, and different widths (about 70 nm and about 170 nm), placed at a center-to-center distance D of about 450 nm, will have a phase difference of approximately $\Delta\varphi=95°$ (0.52 $\pi$) at a wavelength of about $\lambda=1425$ nm. This phase difference is very close to $\Delta\varphi=100°$, the simulated phase difference of isolated DRWs 105 (see the discussion regarding FIG. 1C above). Based on Equation (3), a light beam would be redirected by the DRWs 105 to about $\theta=55°$, which is close to the finite difference time domain (FDTD) simulation shown in FIG. 1F (and see also FIG. 8). The sub-wavelength center-to-center distance of the DRWs 105 (here, D <$\lambda$/3) is important, to avoid multiple diffraction orders. By comparison, a fundamental limitation of conventional diffractive elements is that a presence of spurious diffraction orders is unavoidable. For instance, spurious diffraction orders account for multiple real and virtual focal points in Fresnel zone plates.

As has been shown by FIGS. 1A-1F, meta-surfaces incorporating DRWs 105 are well suited for light-bending. Meta-surfaces incorporating DRWs 105 are also well suited for light splitting.

FIG. 2A conceptually illustrates splitting light in meta-surface, where a 100 nm-wide DRW 205 is located on a substrate 210 in the middle of an aperture 215 in a theoretically perfect absorbing screen. A phase difference is achieved by light propagating in the DRW 205 (with phase $\varphi_2$) and light propagating in air adjacent to the DRW 205 (with phase $\varphi_1$). A length of the DRW 205 was chosen in this example to create a $\Delta\varphi=\pi$ phase difference between the light propagating in the DRW 205 and the light propagating in air (which is based on the effective index as shown in Equation (2)), to cause destructive interference and thus light splitting in the forward direction, as indicated by the angled arrows above the DRW 205 in FIG. 2A representing light propagating in two directions (and not the direction of incidence).

Figure 2B:
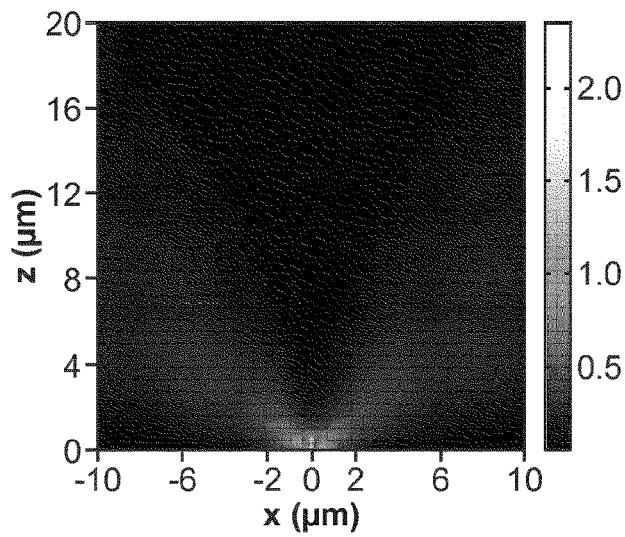
FIG. 2B, FIG. 2C, and FIG. 2D provide simulation results of a DRW according to embodiments of the present disclosure.

FIG. 2B provides results of a test of a DRW 205 such as described with respect to FIG. 2A, showing the light splitting capability provided by the DRW 205.

Figure 2C:
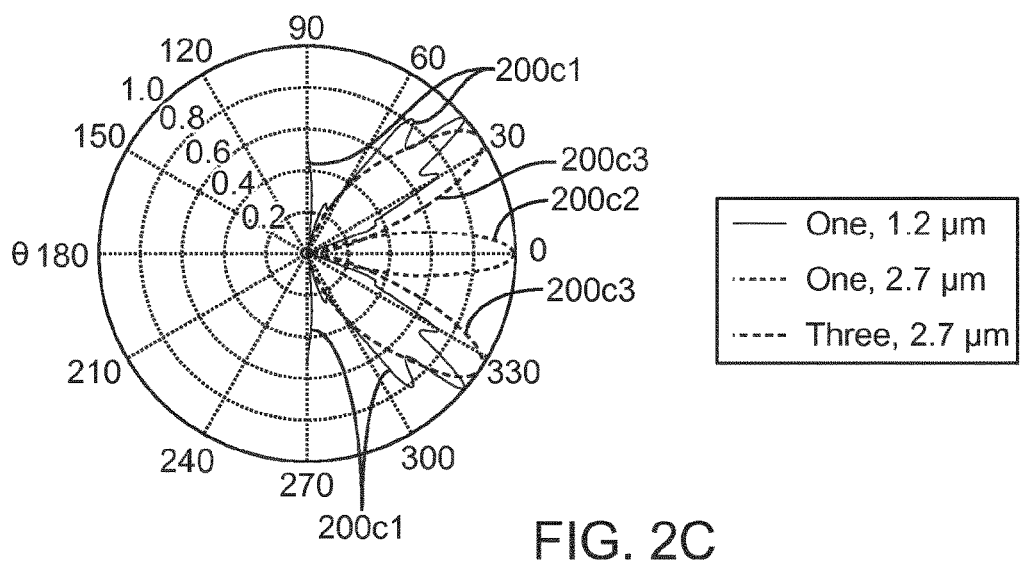

FIG. 2C is a polar plot of simulation results of a DRW 205 such as described with respect to FIG. 2A, showing that a single DRW 205 has a limited scattering cross section. For a 1.2 µm wide aperture 215 and a single 100 nm-wide DRW 205, a majority of the incident light is split (FIG. 2C, plot 200c1). By expanding the aperture 215 width to about 2.7

μm (plot 200c2), the scattering cross section dramatically decreases and the far-field is dominated by diffraction from the aperture. This is a consequence of the optical theorem: note the large forward scattering (θ=0°) which implies a negligible scattering cross section of the DRW 205.

To increase an effective cross section, a number of DRWs 205 in the simulation was increased to three. The far-field response of this case is also shown in FIG. 2C, where three 100 nm-wide DRWs 205 increase the cross section approximately to the full aperture 215 width and split almost 100% of the transmitted light (plot 200c3).

Figure 2D:
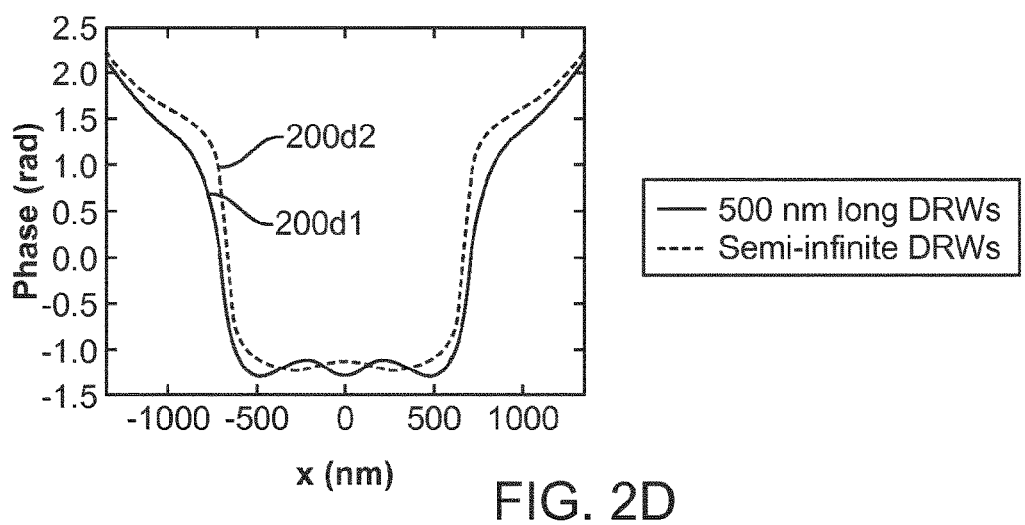

FIG. 2D (plot 200d1) plots simulation results of a phase shift induced by three DRWs 205 each 500 nm long. The phase was recorded at a simulated distance of 10 nm above the tips of the DRWs 205. A phase difference of approximately π is achieved, which results in a destructive interference at θ=0°. Also shown in FIG. 2D (plot 200d2) is a plot of simulation results for the DRWs 205 in which the length of the simulated DRWs 205 was changed to semi-infinite, to eliminate Fabry Perot effects. As shown in FIG. 2D (plot 200d1 versus plot 200d2), the phase distribution is quite similar, confirming that the phase accumulation of the DRWs 205 is due to the waveguiding effect. Although reflection at the facet is inevitable because of index-mismatching between the DRWs 205 and air, this reflection does not have a significant effect on the phase.

Note that, in addition to the destructive interference at θ=0°, a constructive interference occurs at an angle θ=32° based on Equation (3), which is close to the value θ=33° predicted by far-field calculation (FIG. 2C).

Figure 3A:
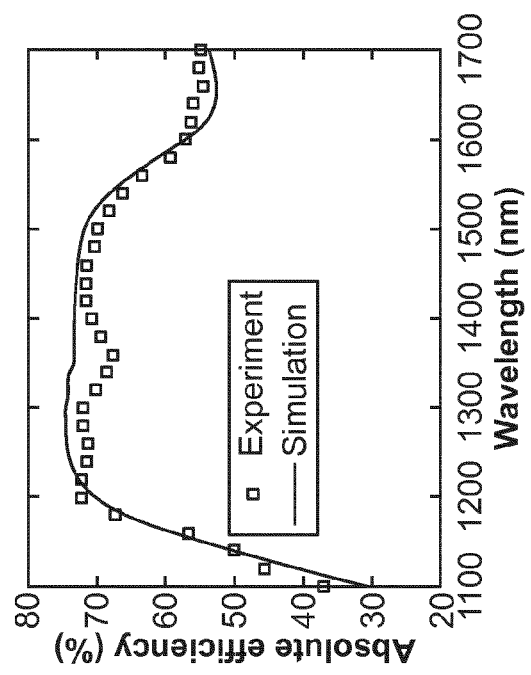
FIG. 3A depicts a meta-grating according to embodiments of the present disclosure, with a comparison of simulation results and experimental results.
Figure 3B:
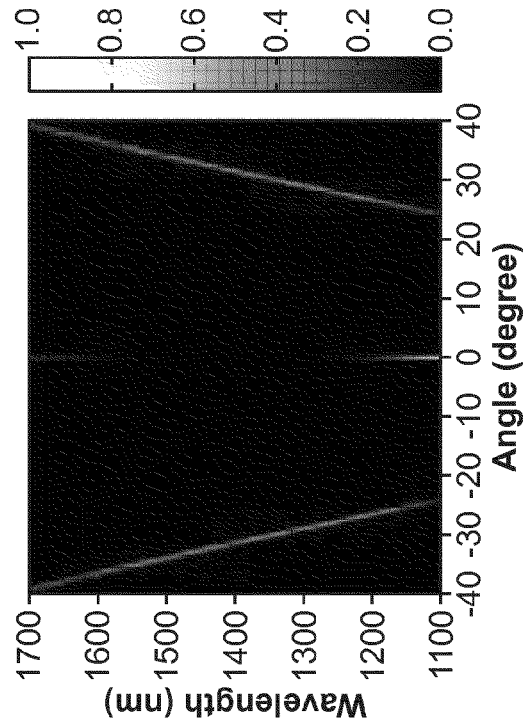
FIG. 3B provides simulation results of a meta-grating according to embodiments of the present disclosure.
Figure 3C:
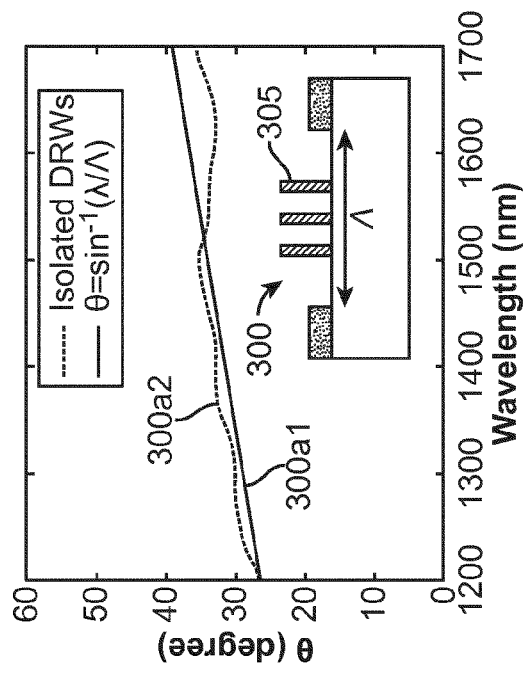
FIG. 3C provides experimental results of a meta-grating according to embodiments of the present disclosure.
Figure 3D:
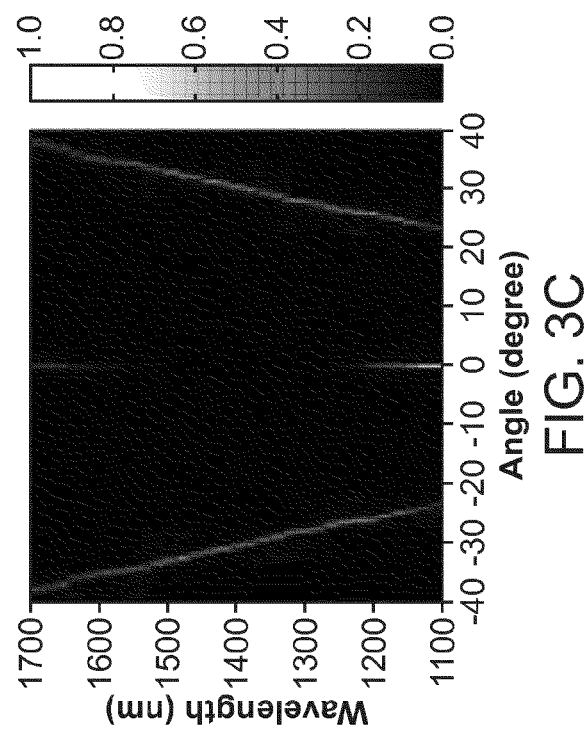
FIG. 3D provides a comparison of simulation results and experimental results of a meta-grating according to embodiments of the present disclosure.
Figure 9:
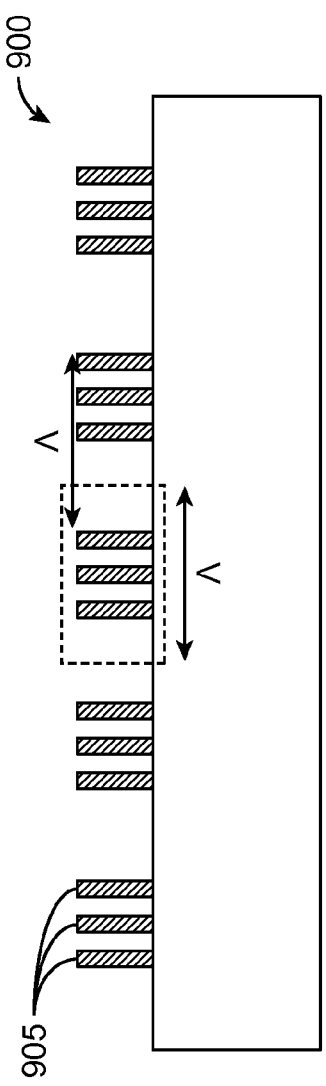
FIG. 9 is a depiction of a meta-grating according to embodiments of the present disclosure.
Figure 10:
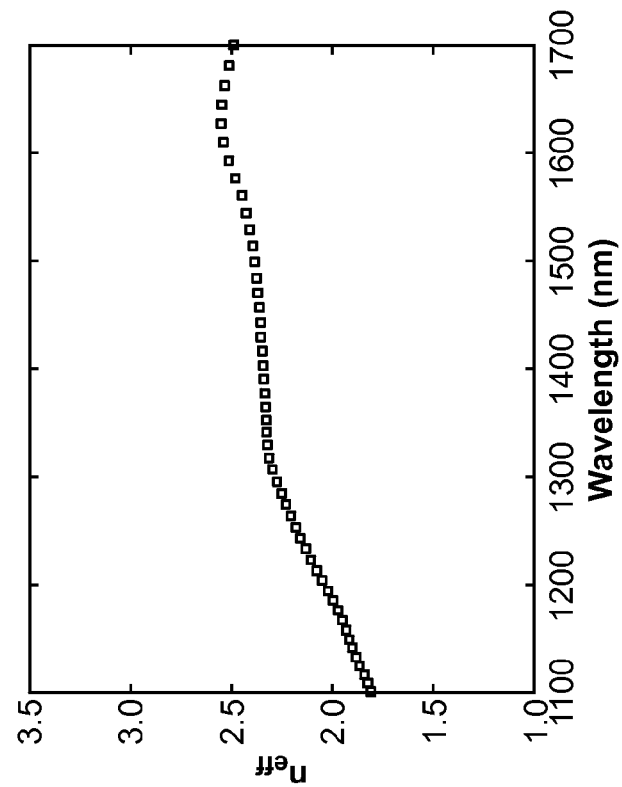
FIG. 10 provides simulation results of a meta-grating according to embodiments of the present disclosure.

FIGS. 3A-3D provide results for a meta-surface embodiment of the present disclosure that is a meta-grating 300 (depicted in an inset of FIG. 3A; and see also another meta-grating embodiment in FIG. 9). The meta-grating 300 includes an array of unit cells, where each unit cell includes three DRWs 305. The unit cell has a period Λ. For broadband operation, the DRWs 305 are designed to diffract normally incident light into the first order of the grating for all wavelengths (a goal as shown in plot 300a1 in FIG. 3A). A simulation shows that this broadband condition can be achieved with good approximation, as shown in plot 300a2 of FIG. 3A. (See also FIG. 10, illustrating a designed effective index of three isolated DRWs). FIG. 3B and FIG. 3C confirm (by simulation and experiment, respectively) that the design is effective in achieving a highly efficient meta-grating for a broad range of wavelengths. FIG. 3D plots a measured absolute efficiency of the meta-grating 300 versus simulation, showing high efficiency of a fabricated meta-grating 300 at most wavelengths, and good agreement with simulations.

The simulation and test results of the meta-grating 300 as presented in FIGS. 3A-3D are with respect to parallel polarization, and the meta-grating 300 behaves differently for other polarizations.

Figure 4A:
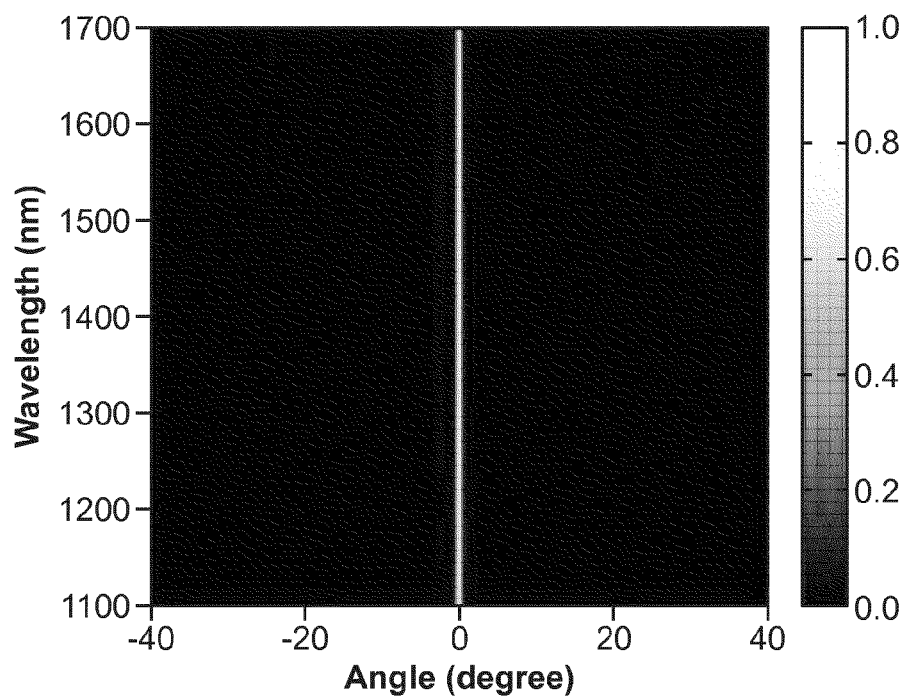
FIG. 4A and FIG. 4B provide simulation results of a meta-grating according to embodiments of the present disclosure.
Figure 4B:
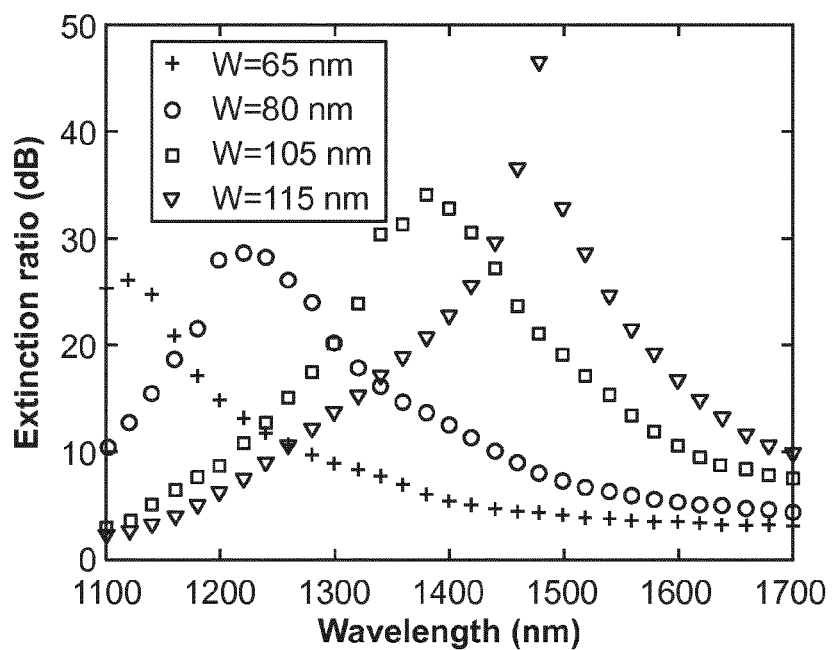

FIGS. 4A-4B present simulation results for polarization perpendicular to a ridge axis of the meta-grating 300. As shown in FIG. 4A, for polarization perpendicular to the ridge axis, more than 95% of light is transmitted undisturbed for wavelengths ranging from about 1100 nm to about 1700 nm. These results are also consistent with the calculation results shown in FIG. 6, in which the effective index of a DRW for widths of interest (W <150 nm) is close to one (air) for perpendicular polarization. In other words, the meta-grating 300 acts as a broadband polarization beam splitter (PBS). Extinction ratio of the PBS is shown in FIG. 4B. The high extinction ratio (more than 45 dB) and efficiency of the PBS can be important for various implementations such as in polarization resolved imaging and microscopy. This polarization management is more efficient than that of conventional wire grid polarizers in which the undesired polarization is discarded via an absorption or a reflection process. In fact, the overall efficiency of the meta-grating 300 for perpendicular polarization as described with respect to FIGS. 4A-4B (more than 95%), and also the overall efficiency of the meta-grating 300 for parallel polarization as described with respect to FIGS. 3A-3D (more than 70%) is well beyond the theoretical limits of 50% for wire grid polarizers. In addition, the meta-grating 300 is ultrathin and has a compact architecture, which facilitates integration into compact systems which would not be possible with a conventional bulky PBS.

Because the meta-grating 300 may be used as a parallel or polarization beam-splitter with high efficiency, the meta-grating 300 is suitable for used in a broad range of optical devices, including, by way of non-limiting example, optical isolators.

Highly efficient light bending also can be achieved by modifying the meta-grating 300 design to suppress the −1 order and funnel the light to the +1 order.

Figure 5A:
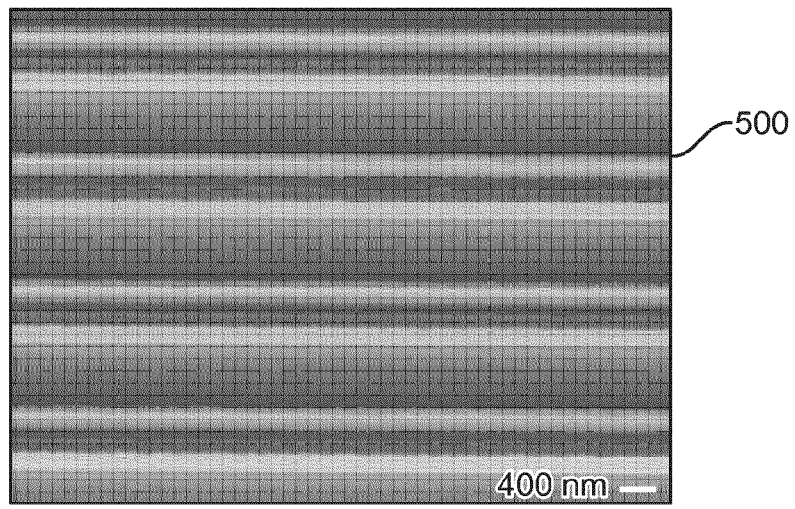
FIG. 5A is an image of a meta-grating according to embodiments of the present disclosure.

FIG. 5A is a scanning electron micrograph (SEM) image of a fabricated meta-grating 500 with three sets of DRWs 505, where each set includes one DRW 505 with a width of about 50 nm and one DRW 505 with a width of about 150 nm, length L of the DRWs 505 is about 500 nm, and center-to-center distance D of the DRWs 505 is about 450 nm.

Figure 5B:
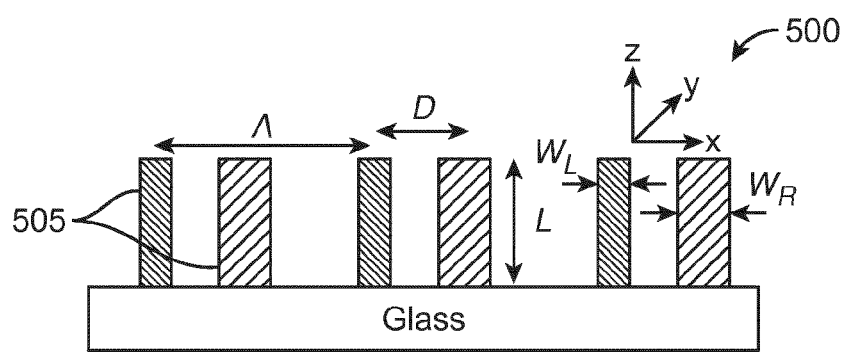
FIG. 5B is a depiction of the meta-grating of FIG. 5B.

FIG. 5B is a depiction of the meta-grating 500 of FIG. 5A. The DRW 505 meta-grating 500 period is about Λ=1700 nm. The aim of this design is to increase a resolving power of the meta-grating 500 by increasing diffraction angle.

Figure 5C:
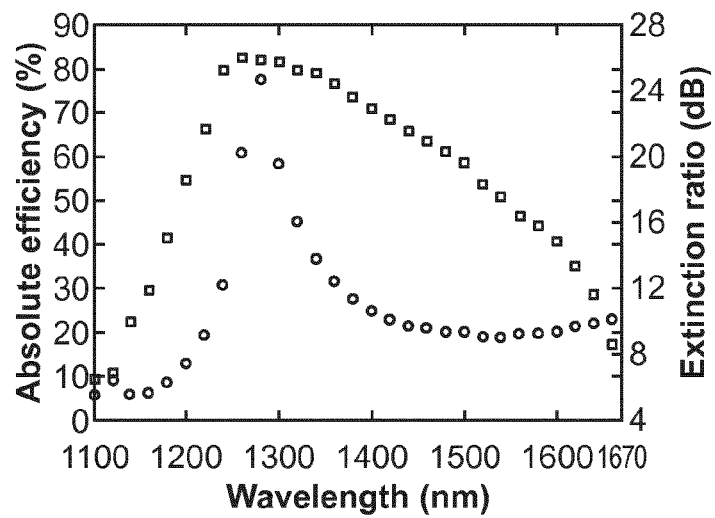
FIG. 5C provides simulation results of the meta-grating of FIG. 5A.

FIG. 5C illustrates that an absolute efficiency of more than 80% is achieved for the meta-grating 500 of FIG. 5A at a wavelength of about λ=1300 nm with a large deflection angle of about θ=50° (sin$^{-1}$(1300/1700)=50°)). Moreover, highly efficient light-bending (50%) is maintained at a very large deflection angle of about θ=65° (wavelength λ=1550 nm). Similar to the case of splitting, this meta-grating also allows a majority of a perpendicularly-polarized beam to pass through undisturbed, thereby behaving as a PBS. The extinction ratio of the PBS is shown in FIG. 5C as measured.

DRW Fabrication

Multiple test meta-gratings were fabricated according to one design of a meta-grating according to an embodiment of the present disclosure. The following describes the techniques used to fabricate the test meta-gratings. Other techniques may additionally or alternatively be used within the scope of the present disclosure. By way of non-limiting example, nano-imprinting or deep ultraviolet (UV) lithography may be used. Although certain chemicals or materials and certain equipment are indicated in the following with respect to fabrication of these particular test meta-gratings, it is to be understood that other materials and chemicals with similar properties, and other equipment with similar capability, may be substituted, and are within the scope of the present disclosure.

First, a substrate (fused silica) was cleaned via acetone sonication followed by an oxygen plasma. Plasma-enhanced chemical vapor deposition (PECVD) was then used to deposit approximately 500 nm of a-Si on the substrate. The sample was spin-coated with polymethyl methacrylate (PMMA, 950K A2) at a speed of about 6000 rpm, and was baked on a hotplate at about 180° C. for about 5 minutes. Next, approximately 5 nm of chromium (Cr) was evaporated on the PMMA to avoid charging effects in a subsequent electron beam lithography (EBL) stage due to poor conductivity of the glass substrate (Cr is removed right after EBL). EBL was carried out by an electron beam lithography machine (Elionix ELS-F125) at about 125 kV. The exposed resist was then developed in a mixture of methyl isobutyl ketone and isopropyl alcohol (MIBK:IPA 1:3) for about 60 seconds, dipped in IPA for about 30 seconds, and blown dry using nitrogen. Aluminum (Al, 20 nm) was then thermally deposited. A lift-off stage was accomplished by soaking the sample overnight in a solvent stripper (Remover PG from Microchem). Inductively-coupled plasma-reactive ion etching (ICP-RIE) was performed to etch the DRWs. The Al mask was removed by soaking in developer (MF319 from Shipley) for about 5 minutes.

The overall dimensions of the fabricated meta-gratings was about 125 μm×about 125 μm for light splitting, and about 600 μm×about 600 μm for light bending. As the incident beam size (e.g., 4 mm×4 mm) used for measurement is larger than the size of meta-grating, the area around the meta-grating was blocked by depositing about 150 nm thick Al, by optical lithography and a lift-off process.

Figure 6:
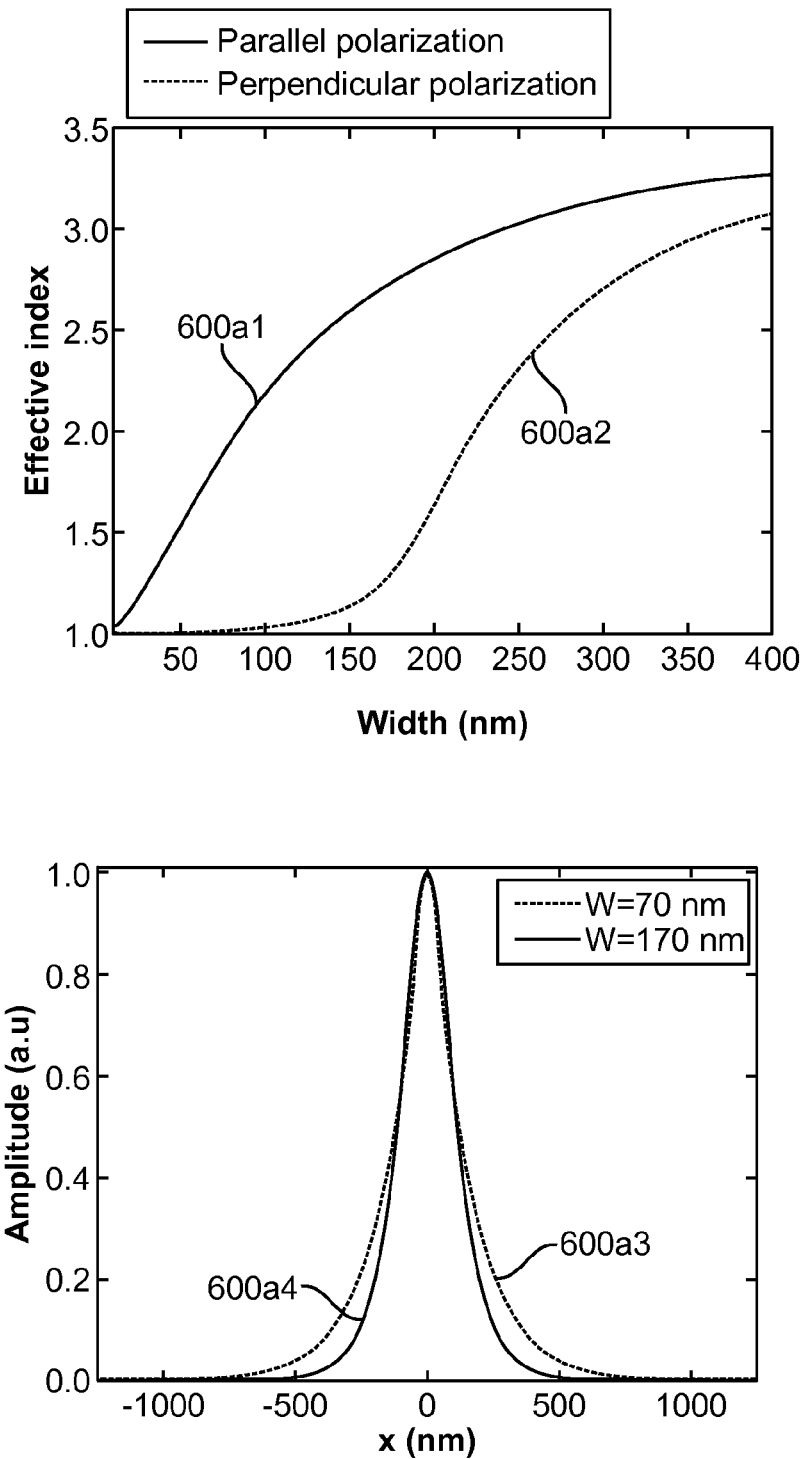
FIG. 6A and FIG. 6B provide simulation results of a meta-grating according to embodiments of the present disclosure.

FIG. 6 plots simulation results for a meta-grating design according to embodiments of the present disclosure. The left-hand plot of FIG. 6 shows the effective index of a DRW as function of width for parallel ($E_y$, plot 600a1) and perpendicular ($E_x$, plot 600a2) polarization. The effective mode indices of simulated a-Si nanoridge DRWs were calculated for two polarizations (by Mode Solver module of RSoft), shown in the left plot of FIG. 6. A large birefringence effect is achieved in particular for narrower waveguides. There is a large index difference for the two polarizations. For perpendicular polarization, effective indices are around one for widths smaller than about 150 nm, resulting in negligible light-DRW interaction at this polarization. These simulation results are in good agreement with the results of FIGS. 4A-4B. The meta-grating acts as a transparent media for perpendicular polarization.

The right-hand plot of FIG. 6 shows optical modes of two DRWs with widths of about W=70 nm (plot 600a3) and about W=170 nm (plot 600a4) for a wavelength of about 1425 nm and parallel polarization. The modes are quite similar. The 170 nm-wide waveguide has a slightly smaller beam waist as compared to that of the 70 nm-wide waveguide. By fitting Gaussian beams to these modes, beam waists of approximately 240 nm are calculated for both W=70 nm and W=170 nm.

Figure 7A:
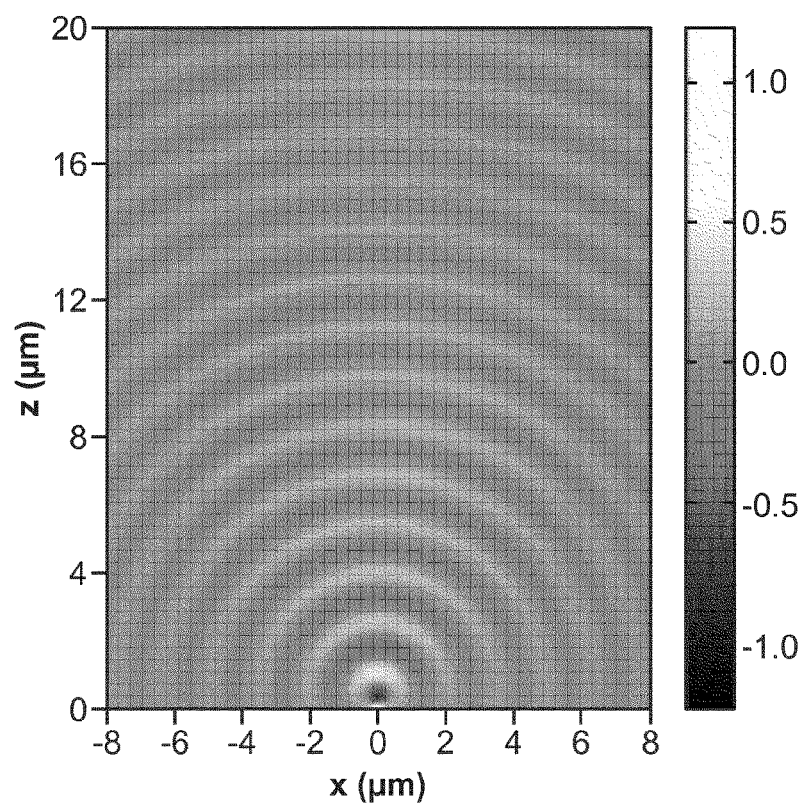
FIG. 7A and FIG. 7B provide simulation results of a DRW according to embodiments of the present disclosure.
Figure 7B:
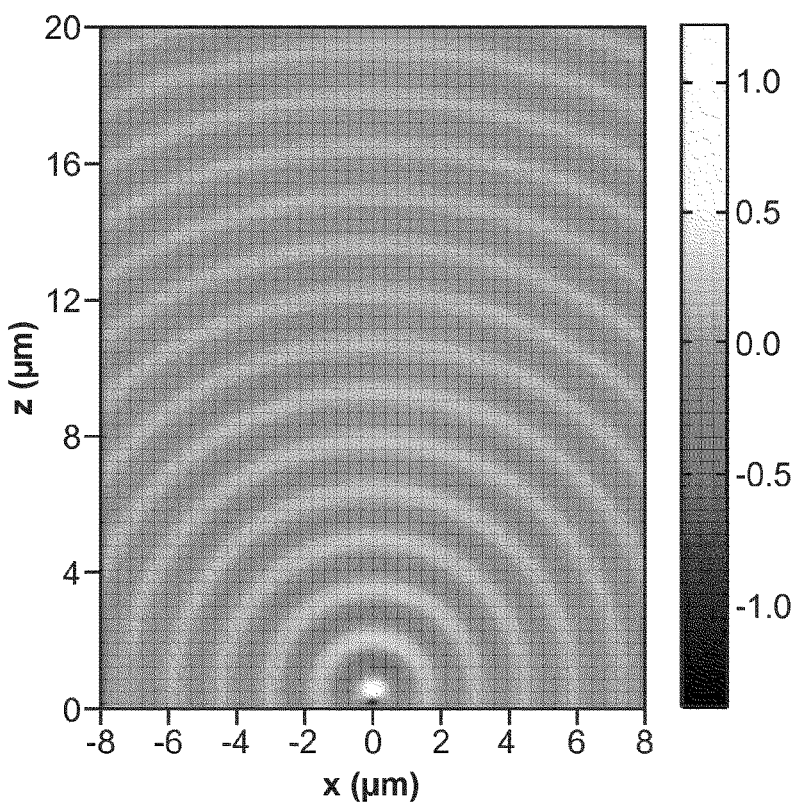

FIGS. 7A-7B provide simulation results illustrating that DRWs with different widths radiate similarly into free space. The plot in FIG. 7A shows an electric field (Real $[E_y]$) distribution in the xz-plane for isolated DRWs with a design width of W=70 nm, and FIG. 7B shows an electric field distribution in the xz-plane for isolated DRWs with a design width of W=170 nm. The DRWs of the plots in FIGS. 7A and 7B have design lengths of L=500 nm, and simulations are performed for a parallel polarized beam ($E_y$) and wavelength of λ=1425 nm.

Figure 8:
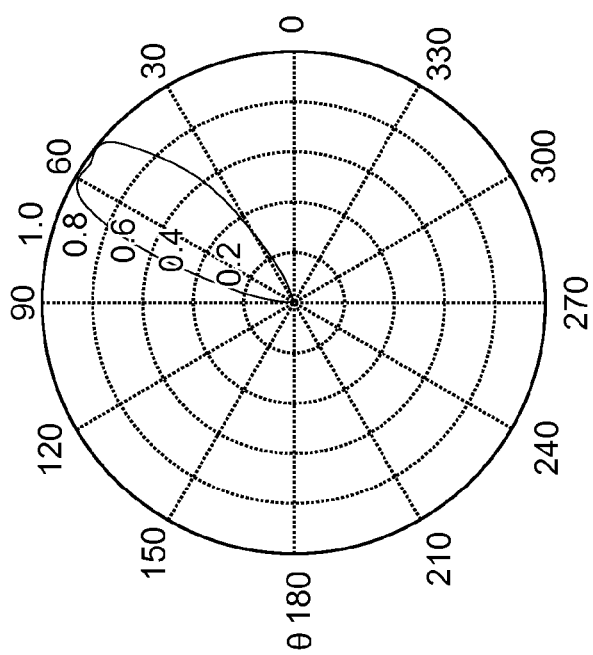
FIG. 8 provides simulation results of a meta-grating according to embodiments of the present disclosure.

FIG. 8 plots simulated far-field responses for two isolated DRWs, confirming efficient light bending with a majority of light directed to about θ=55°. The two simulated DRWs of FIG. 8 are designed to have respective widths of W=70 nm and W=170 nm, with length L=500 nm and center-to-center distance D=450 nm. Polarization is parallel and wavelength is 1425 nm.

FIG. 9 illustrates an example of a five period (Λ) meta-grating 900 according to an embodiment of the present disclosure, in which a meta-grating 900 unit cell (period) includes three DRWs 905 that are substantially the same (e.g., in terms of material, size, proportion and manufacture).

FIG. 10 provides simulation results of a calculated effective index of three isolated DRWs, each of width W=105 nm, length L=500 nm and separation D=500 nm.

Simulations and Measurements

With respect to simulations described above, unless otherwise indicated, simulations were performed in two dimensions (2D), due to the relatively large extension of the meta-gratings, using an FDTD technique (FDTD Solutions package from Lumerical Inc.) For meta-grating simulations, periodic boundary conditions were applied at x-boundaries and PML at z-boundaries. For isolated DRW cases (non-periodic DRWs), PML conditions were assumed for both x- and z-boundaries.

With respect to test results of fabricated meta-gratings described above, unless otherwise indicated, the following test/measurement setup was used. The measurement setup included a supercontinuum laser (NKT SuperK) equipped with a set of acousto-optic tunable filters (NKT Select) with a fiber output. The fiber was connected to a fiber-coupled collimator, creating a collimated beam with size of about 4 mm×about 4 mm. The collimated beam passed through a linear polarizer which was adjusted appropriately for each measurement. Light transmitted through the meta-grating was measured by an indium gallium arsenide (InGaAs) photodetector (Thorlabs DET10D) mounted on a rotation stage. All measurements were normalized to a power passing through an aperture with the same size of meta-grating fabricated on a glass substrate.

In summary, a new concept for wavefront shaping using DRWs has been presented. The capability of the DRWs to control phase via sub-wavelength propagation with minimal loss highlights their promise as building blocks to realize versatile optical functionalities in ultra-compact and efficient configurations. It was experimentally demonstrated that meta-gratings using DRWs have broadband and efficient routing (splitting and bending) into a single diffraction order, as well as PBS capabilities. Note that broadband and efficient operation is not possible with either conventional blazed gratings or with light-bending components that are based on other types of meta-surfaces or on metamaterials.

The approach described in the present disclosure has the attractive features of straightforward fabrication, design flexibility, and reproducibility in large scale.

When integrated with an image sensor, the proposed meta-grating could provide for high efficiency spectroscopy and imaging. In addition, the concept is extendable to other spectral bands, such as into the mid/far-infrared band, where a-Si maintains its low loss.

While a-Si DRWs have been described herein, other materials may alternatively or additionally be used in the fabrication of DRWs, and in the case of multiple DRWs in the phase shift element, different ones of the DRWs may be of the same or different material(s). Generally, a material used for the DRWs exhibits low loss at a wavelength of interest, and has a relatively high refractive index. For example, a refractive index of the material is greater than about 1.5. For the visible range, examples of a suitable material include gallium phosphide, a titanium oxide, and silicon nitride.

Also, while a-SI on a glass substrate has been described herein, which provides for reduced-cost fabrication, other materials are within the scope of the present disclosure. For example, a silicon on insulator (SOI) implementation may be used.

Figure 11:
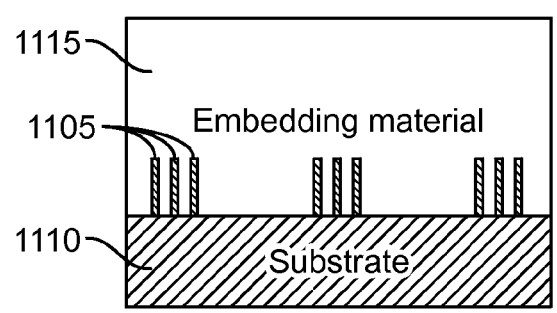
FIG. 11 depicts an example of DRWs embedded in an embedding material according to embodiments of the present disclosure.

Further, one or more DRWs may be at least partially embedded (and in the extreme, buried) in a low refractive index material with a refractive index less than about 1.7, or at least partially embedded (and in the extreme, buried) in a dielectric material or a polymer. For example, FIG. 11 depicts an example of multiple DRWs 1105 disposed on a substrate 1110, where the DRWs 1105 are fully embedded (buried) in an embedding material 1115 according to embodiments of the present disclosure.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For another example, two values that are substantially the same (e.g., width or length) can refer to a standard deviation between the values of less than 10% of an average value, such as less than 5%, less than 2%, or less than 1%.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A meta-surface, comprising:
   a substrate; and
   an array of periodic unit cells, where each periodic unit cell includes two dielectric ridge waveguides (DRWs) disposed on the substrate and configured to change a direction of incident electromagnetic energy in a predefined energy spectrum;
   wherein, in each unit cell, a width of a first of the DRWs is greater than a width of a second of the DRWs, and a center-to-center distance between the two DRWs is less than a minimum wavelength of electromagnetic energy in the predefined energy spectrum, and a refractive index of the first of the DRWs and a refractive index of the second of the DRWs are substantially the same.

2. The meta-surface of claim 1, wherein the width of the first DRW and the width of the second DRW are each less than one half of a minimum wavelength of the incident electromagnetic energy in the predefined energy spectrum.

3. The meta-surface of claim 1, wherein the first DRW and the second DRW each comprise a material with a refractive index greater than 1.5.

4. The meta-surface of claim 3, wherein the first DRW and the second DRW each comprise one of amorphous silicon, gallium phosphide, a titanium oxide, or silicon nitride.

5. The meta-surface of claim 3, wherein at least one of the first DRW and the second DRW comprises amorphous silicon.

6. The meta-surface of claim 1, wherein the periodic unit cells each include no more than three DRWs.

7. A meta-grating, comprising:
   a substrate; and
   a plurality of periodic unit cells, each periodic unit cell comprising a respective plurality of dielectric ridge waveguides (DRWs) disposed on the substrate, wherein in each unit cell:
   a width of a first of the DRWs of the respective plurality of DRWs is greater than a width of a second of the DRWs of the respective plurality of DRWs, and
   the first of the DRWs of the respective plurality of DRWs and the second of the DRWs of the respective plurality of DRWs comprise a same material.

8. The meta-grating of claim 7, configured to change a direction of incident electromagnetic energy in a predefined energy spectrum, wherein the DRWs of each of the periodic unit cells are arranged in pairs, and in each pair:
   a center-to-center distance between the pair of DRWs is less than a minimum wavelength of electromagnetic energy in the predefined energy spectrum.

9. The meta-grating of claim 7, wherein a width of each of the DRWs is less than one half of a minimum wavelength of incident electromagnetic energy in a predefined energy spectrum.

10. The meta-grating of claim 7, configured to split incident electromagnetic energy to electromagnetic energy directed in two directions, wherein the DRWs of each of the periodic unit cells are arranged in unit cells of three DRWs.

11. The meta-grating of claim 7, wherein the DRWs each comprise a material with a refractive index greater than 1.5.

12. The meta-grating of claim 11, at least one of the DRWs comprising amorphous silicon.

13. The meta-grating of claim 11, the DRWs each comprising one of amorphous silicon, gallium phosphide, a titanium oxide, or silicon nitride.

14. The meta-grating of claim 7, wherein the meta-grating is configured to disperse the incident light and act as a grating.

15. The meta-grating of claim 7, wherein the meta-grating is configured to spatially separate two orthogonal polarizations of incident light.

16. The meta-grating of claim 7, wherein the DRWs are configured to redirect one polarization of incident light and allow other polarizations of incident light to pass through undisturbed.

17. The meta-grating of claim 7, further comprising an embedding material disposed on the substrate, wherein the DRWs are embedded in the embedding material, and the embedding material is a low refractive index material with refractive index less than 1.7.

18. The meta-grating of claim 7, further comprising an embedding material disposed on the substrate, wherein the DRWs are embedded in the embedding material, and the embedding material is a dielectric material or in a polymer.

19. The meta-grating of claim 7, wherein the meta-grating is configured as a polarization beam splitter.

20. The meta-grating of claim 19, wherein the meta-grating is incorporated into an optical isolator.

* * * * *